(12) United States Patent
Grace et al.

(10) Patent No.: US 8,019,806 B2
(45) Date of Patent: Sep. 13, 2011

(54) METHOD AND APPARATUS FOR DISPLAYING NETWORK FABRIC DATA

(75) Inventors: Jennifer Lynn Grace, San Jose, CA (US); Nitin A. Mehendale, San Jose, CA (US); Shannon L. Kohl, San Mateo, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 3275 days.

(21) Appl. No.: 10/273,024

(22) Filed: Oct. 17, 2002

(65) Prior Publication Data

US 2004/0075680 A1 Apr. 22, 2004

(51) Int. Cl.
*G06F 15/16* (2006.01)
(52) U.S. Cl. ......... 709/202; 709/203; 709/220; 709/223
(58) Field of Classification Search .................. 715/526, 715/734; 714/6; 709/202, 203, 220, 223
See application file for complete search history.

(56) References Cited

U.S. PATENT DOCUMENTS 6,442,706 B1 * 8/2002 Wahl et al. ........................ 714/6
7,222,153 B2 * 5/2007 Ando et al. .................... 709/203
* cited by examiner

*Primary Examiner* — Jason D. Cardone
*Assistant Examiner* — Adnan Mirza
(74) *Attorney, Agent, or Firm* — Wong, Cabello, Lutsch, Rutherford & Brucculeri LLP

(57) ABSTRACT

The invention relates to graphical user interfaces for managing electronic networks, such computer networks, storage area networks (SANs), and the like. Specifically, the invention provides a simplified means of managing large numbers of parameters associated with devices in such networks. In a preferred embodiment, the invention provides a method of displaying devices forming a network. In a first step, a computer system associated with a graphical user interface queries the network to determine what devices are present in the network, and the interconnections of such devices. The results of this determination are stored, as is the time of this determination. Later, a second query is performed and the results are compared to the first query. Symbols representing elements of the network are displayed on the graphical user interface. When changes are detected between the first and second network query, the changes are indicated by altering the manner in which the symbols are displayed that represent the elements of the network that have changed.

28 Claims, 17 Drawing Sheets

FIG. 12

METHOD AND APPARATUS FOR DISPLAYING NETWORK FABRIC DATA

BACKGROUND OF THE INVENTION

1. Field of the Invention

The invention relates to graphical user interfaces for managing electronic networks, such computer networks, storage area networks (SANs), and the like. Specifically, the invention provides a simplified means of managing large numbers of parameters associated with devices in such networks.

2. Description of the Related Art

The continuing development and implementation of networks represents a growing challenge for managing the complex and dynamic operations of such systems. Computing, data storage, and communications networks are just a few examples of networks for which new devices and methods of sharing data are continually developed and improved. Design objectives associated with networks are often focused on performance. In some cases, such networks may require periodic maintenance and management to optimize performance and efficiency. Graphical user interfaces are generally employed to assist in monitoring network performance and communicating with and controlling the behavior of software-driven devices on a network. In some cases, the efficiency by which such an interface can be used to manage a network can actually impact the performance of the network, especially where a network system depends on operators to identify problems and conduct optimizations manually.

By way of example, computing and data storage networks illustrate various needs and objectives of network management through graphical user interfaces. The Fibre Channel family of standards (developed by the American National Standards Institute (ANSI)) defines a high speed communications interface for the transfer of large amounts of data between a variety of hardware systems such as personal computers, workstations, mainframes, supercomputers, storage devices and servers that have Fibre Channel interfaces. Use of Fibre Channel is proliferating in client/server applications which demand high bandwidth and low latency I/O such as mass storage, medical and scientific imaging, multimedia communication, transaction processing, distributed computing and distributed database processing applications.

Fibre Channel offers advantages over traditional channel and network technology. Conventional channel technology (e.g., telephony) provides a point-to-point connection (or service) form one device to another. Conventional channels deliver data with high speed and low latency. Channels, however, are not suited for providing connectivity among many clients and are not suited for small-packet bursty traffic. Conventional networks provide shared access to bandwidth and are designed to handle unpredictable and bursty traffic. Networks, however, are software intensive and are not able to meet the growing bandwidth requirements of many client/server applications.

Fibre Channel is an alternative to conventional channel and network connectivity technologies and is used to deliver high speed and low latency connectivity among many clients. Fibre channel establishes logical point-to-point connectivity from a source device node (port) to a destination device node (port) (a logical port-to-port serial channel). The logical port-to-port serial channel is used to transfer data from a source device (node) to a destination device node. Each node (source and destination) has a buffer (either a send buffer or a receive buffer) and data transfer is effected by moving data from the send buffer at the source node to a receive buffer at the destination node. Because the transfer scheme is logically point-to-point (node-to-node) there is no need for Fibre Channel to handle various network protocols. With Fibre Channel, data is moved from one node to another without regard to data format or meaning.

Fibre Channel uses one of several topologies (e.g., a point to point topology, a fabric topology, or a loop topology) to establish a logical point-to-point serial channel. The Fibre Channel point to point topology connects two Fibre Channel systems directly. The Fibre Channel loop topology is an arbitrated loop with ring connections that provide arbitrated access to shared bandwidth. The Fibre Channel fabric topology uses a switching fabric built from one or more Fibre Channel switches to provide a bidirectional connection from one node to another. With the fabric topology, each Fibre Channel node (device) manages only a simple point-to-point connection between itself and the fabric and the fabric manages and effects the connection between the nodes. Each transmitting node (port) enters the address of a destination node (port) in a frame header and the fabric establishes the connection.

The devices that are coupled to form such a network generally include a variety of software-driven configurations, parameters, and logical instructions that can be managed to provide optimized performance of the network. In certain instances, a mismatch of such parameters can cause reconfiguration of the fabric. Additionally, it is very common for devices to be added to or removed from a given network. There is thus a continuing need for graphical user interfaces and methods of displaying various devices forming the network as well as operating information associated with the devices to facilitate efficient and convenient network management.

BRIEF SUMMARY OF THE INVENTION

The invention relates to graphical user interfaces for managing electronic networks, such as computer networks, storage area networks (SANS), and the like. Specifically, the invention provides a simplified means of managing large numbers of parameters associated with devices in such networks.

In a preferred embodiment, the invention provides a method of displaying devices forming a network. In a first step, a computer system associated with a graphical user interface queries the network to determine what devices are present in the network, and the interconnections of such devices. The results of this determination are stored, as is the time of this determination. Later, a second query is performed and the results are compared to the first query. Symbols representing elements of the network are displayed on the graphical user interface. When changes are detected between the first and second network query, the changes are indicated by altering the manner in which the symbols are displayed that represent the elements of the network that have changed. As an example, such a change in the network could include the loss of connectivity to a switch, server, or storage device. The symbol for the network element lost would then be displayed translucently, or in another color, as examples, to indicate the change.

Network parameters, such as the devices coupled to the network and the configurations of such devices, can be displayed in various ways under the invention. For example, such information can be displayed in diagram form or in table form. In a preferred embodiment, the graphical user interface includes an expandable tree diagram of expandable symbols that can be navigated to explore the structure of a network. As an example, the tree diagram can be one of a series of windows that make up the user interface as a whole. In various possible embodiments, other portions of the user interface (e.g., windows) can include a summary of a symbol of the tree diagram that is selected by a user, and an event log displaying a running history of network connectivity and configuration changes that are detected. Various possible embodiments may include other features as described herein, either alone or in combination.

In another aspect, the invention provides a method of displaying devices forming a network, including the following steps: (1) determining at a first time the presence of a first device and the connection of a first set of devices to the first device; (2) determining at a second time the presence of the first device and the connection of a second set of devices to the first device; (3) comparing the first set of devices to the second set of devices; (4) determining a second device that is coupled to the first device at the first time, wherein the second device is not coupled to the first device at the second time; (5) displaying onto a graphical user interface a first symbol of the first device and a second symbol of the second device, wherein the second symbol comprises a graphical indication that the second device is not coupled to the first device at the second time.

In still another aspect, the invention provides a method of displaying changes in device connections over time in a network, including the following steps: (1) displaying on a graphical user interface a primary device and a set of secondary devices coupled to the primary device from a first time reference; (2) displaying on the graphical user interface the set of secondary devices coupled to the primary device from a second time reference; and (3) indicating a change in the set of secondary devices from the first time reference to the second time reference by altering an appearance of a symbol for a changed device in the set of secondary devices on the graphical user interface.

The invention also provides an apparatus for displaying changes in device connections over time in a network. The system includes a computer or user interface circuit that has a first display mode wherein a first device and a first set of devices coupled to the first device are displayed. As example, the first device can be a network switch, and the first set of devices can be a series of electronic storage devices such as hard drives. The system also has a second display mode wherein a display of a second set of devices is combined with the first set of devices, such that a second device is displayed in a manner indicating the second device is present in only one of the first and second sets. The second device is generally the same as the first device, but represents a snapshot of the device at a later time. Likewise, the second set of devices is generally the same as the first set of devices, but represents a snapshot of the devices at a later time. The "snapshots" of the devices are compared between the first and second times, and any change detected is displayed by modifying the appearance of the symbol(s) displayed for whatever element of the network it is that has changed.

Additional embodiments of the invention can also include any of the other features described herein, either alone or in combination. Advantages and other features of the invention will become apparent from the following description, drawings and claims.

BRIEF DESCRIPTION OF THE DRAWINGS

FIG. 12 is a view of a graphical user interface showing an expandable tree diagram of expandable symbols representing network devices and details of a user selected symbol.

DETAILED DESCRIPTION OF THE INVENTION

Figure 1:
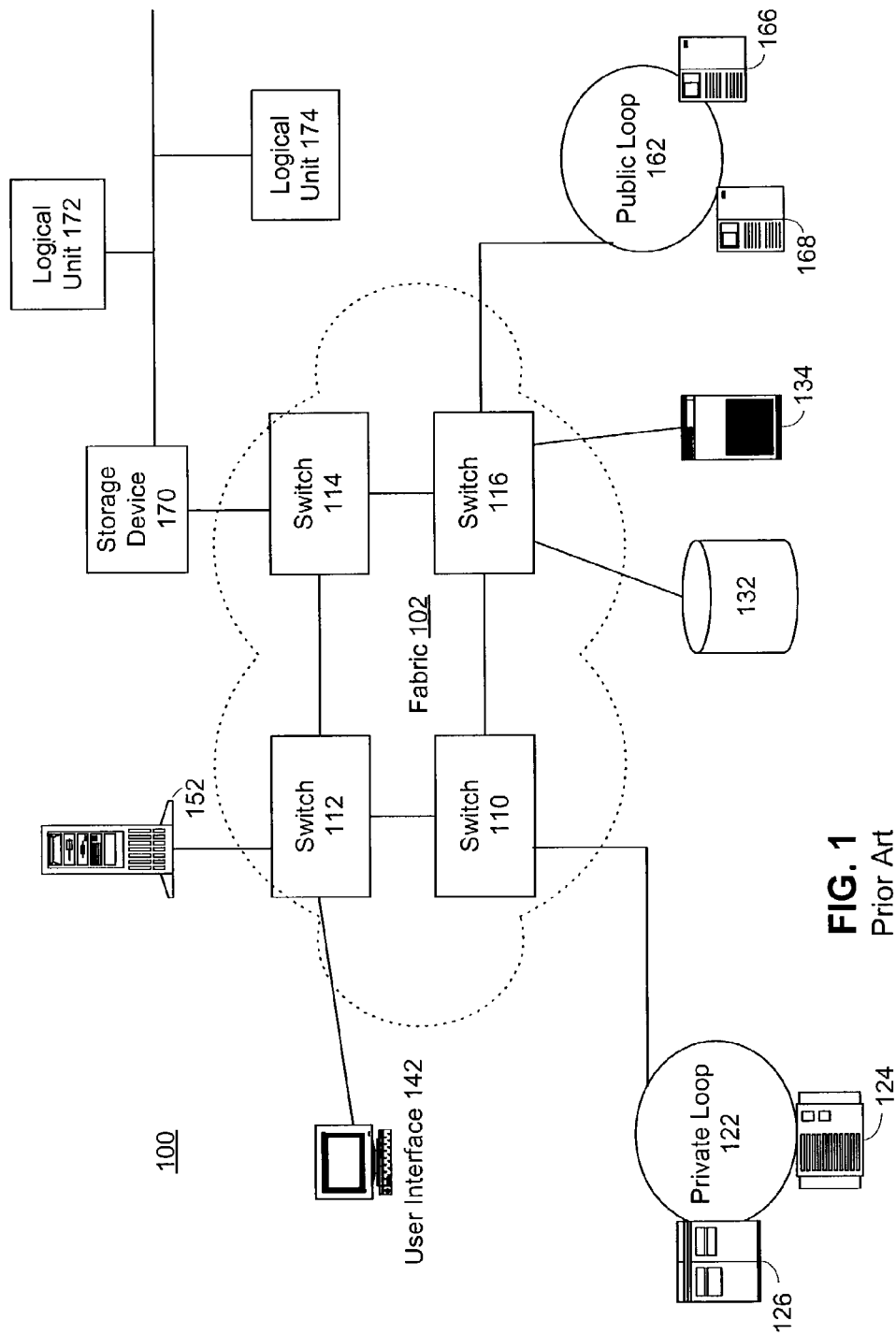
FIG. 1 is a general view of a SAN.

Referring now to FIG. 1, a storage area network (SAN) 100 is shown. A fabric 102 is the heart of the SAN 100. The fabric 102 is formed of a series of switches 110, 112, 114, and 116, preferably Fibre Channel switches according to the Fibre Channel specifications. The switches 110-116 are interconnected to provide a full mesh, allowing any nodes to connect to any other nodes. Various nodes and devices can be coupled to the fabric 102. For example a private loop 122 according to the Fibre Channel loop protocol is coupled to switch 110, with hosts 124 and 126 coupled to the private loop 122. That way the hosts 124 and 126 can communicate through the switch 110 to other devices. Storage unit 132, preferably a unit containing disks, and a tape drive 134 are coupled to switch 116. It will be appreciated that the term "coupled" refers generically to various types of electronic connections, including direct connections and indirect connections where devices are joined through a series of intermediate connections (e.g., through other devices). A user interface 142, such as a work station, is coupled to switch 112, as is an additional host 152. A public loop 162 is coupled to switch 116 with disk storage units 166 and 168, preferably RAID storage arrays, to provide storage capacity. A storage device 170 is shown as being coupled to switch 114, with the storage device 170 having a logical unit 172 and a logical unit 174. It is understood that this is a very simplified view of a SAN 100 with representative storage devices and hosts coupled to the fabric 102. It is understood that quite often significantly more devices and switches are used to develop the full SAN 100.

Figure 2:
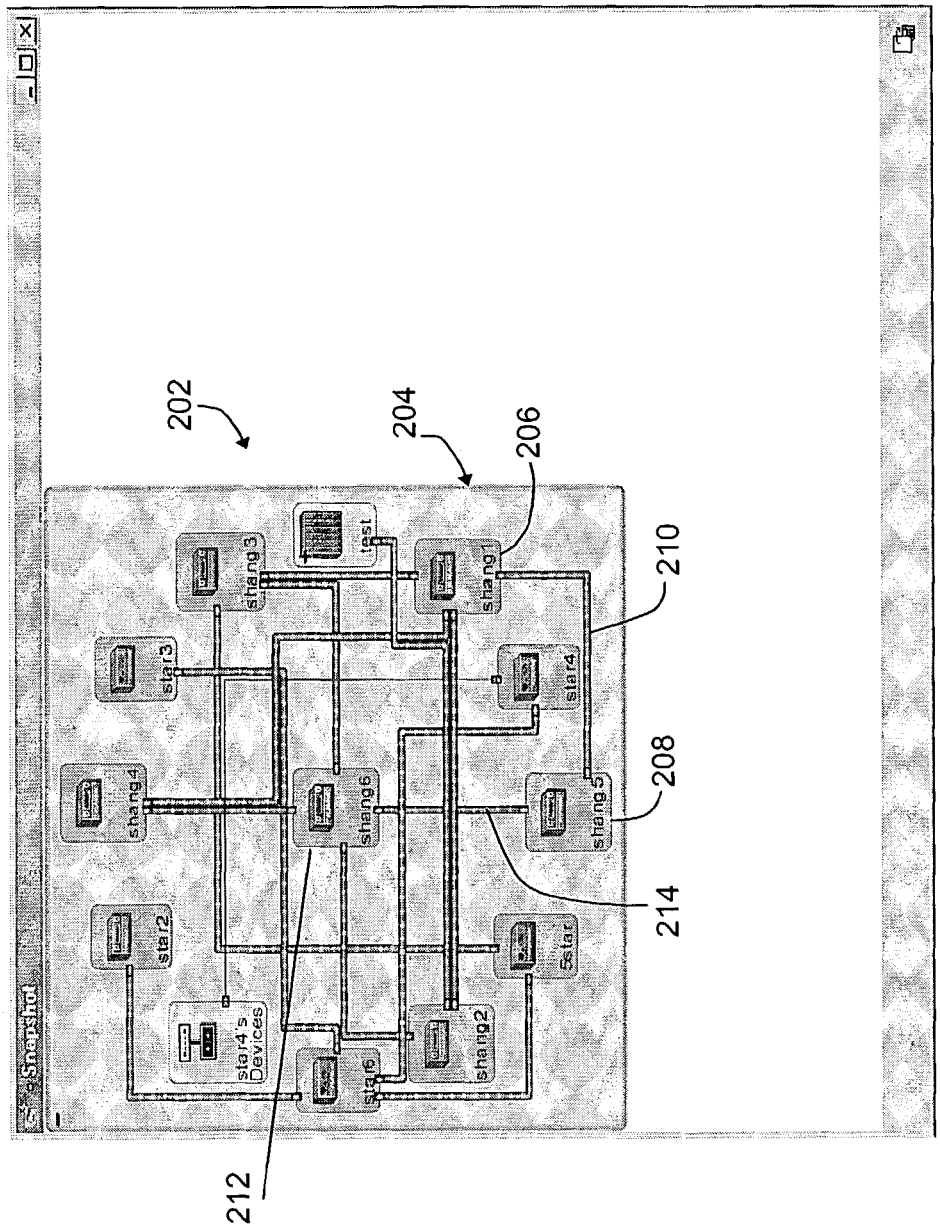
FIG. 2 is a view of a graphical user interface showing a diagram of a network.

Referring to FIG. 2, a view is shown of a graphical user interface 200 showing a diagram 202 of a network 204. Interface 200 is size adjustable and may form a portion of a more detailed interface (See, e.g., FIGS. 6-17). In the context of this invention, a graphical user interface refers to an electronic rendering (display) of a status of a computer program. Typically, graphical user interfaces include a means by which an operator can change the status of the program, such as a keyboard or a mouse. In this example, the interface 200 is a window from a Microsoft Windows™ operating system. While the present invention is generally illustrated herein through examples operating in a Microsoft Windows™ environment, it will be appreciated that the invention also applies to other types of computer systems and operating environments.

In the example shown in FIG. 2, the diagram 202 shows a collection of various devices that are coupled to form a network 204. In this example, the devices are a group of switches in a Fibre Channel SAN. The Silkworm™ family of network switches from Brocade Communication Systems, Inc., is an example of such devices commonly used in the computer network industry. The diagram 202 graphically illustrates how each device in the network is coupled to other devices in the network. In this example, the "network" 204 has been user-defined to display only the switches in the SAN. Other views are possible, such as of storage devices and servers associated with the network 204. The diagram 202 can also have the capability of displaying more detailed information about a given device, for example, if a device is user-selected such that one of the icon symbols of the diagram 202 is divided into additional categories of information.

In the diagram 202 shown in FIG. 2, various information is displayed to describe the connections between the various devices in the network 204. For example, a first device 206 and a second device 208 are shown coupled via connection 210. The second device 208 is further coupled to a third device 212 via connection 214. Connection 210 is shown in a first color (e.g., green) indicating a healthy status (e.g., no problems are detected with the connection). Connection 214 is shown, in a second color (e.g., red) indicating a problem with this connection (e.g., the connection has been lost). Connections 210 and 214 are each displayed using the same pattern, indicating the same general type of connection. For example, lines of different patterns could be used to differentiate between copper/wire connections versus fiber links, ISL trunk links, bundled links, etc.

The particular diagram 202 in FIG. 2 is referred to as a "snapshot" because it represents a recorded status of the network 204 at a given time. For example, under one method provided by the invention, a determination is made at a first time of the devices forming the network and the interconnections of the devices. As previously indicated, in this example, the devices of interest have been user-defined to include the network switches specifically, but in other examples other devices and information could be included as well. The results of this determination are stored in a computer associated with the interface 200 This snapshot of the status of the network 204 at a first time can be referred to as a reference network arrangement.

A determination is then made at a second time of the devices forming the network and the interconnections of the devices. The results of this determination are compared to the reference network arrangement, and a graphical display is provided of the devices forming the network and the interconnections of the devices in the reference network arrangement, with changes from the reference network arrangement to the second time being shown in an altered manner. In general, a display of the network representing the first time reference can be referred to as a first display mode, and a display of the network representing the second time reference can be referred to as a second display mode.

Such a comparison is illustrated by reference to FIG. 3, wherein a view is shown of a graphical user interface 300 showing a diagram 302 of a network 304. In this example, devices 316 and 318 were present in the network 304 at the first time, but were not present at the second time. Networks 204 and 304 are essentially the same except that the devices 316 and 318 have been removed in the snapshot shown in FIG. 3. Devices 316 and 318 are therefore displayed in an altered manner with respect to the other icon symbols for the other devices shown. In this example, the "altered manner" of display refers to the display of translucent symbols for devices 316 and 318, indicating a change in the selected aspects of the network 304 from the first time to the second time. The diagram 302 of FIG. 3 represents a comparison of the state of the network 304 between two time references, and thus can be referred to as a combination of displays of such devices from the first and second time references, with differences being emphasized.

Various approaches can also be used to convey additional information. For example, instead of changing the relative translucency of icons to indicate such a change, the color of symbols may also be changed. Additional information may also be conveyed, for example, a display of an icon in a first color might indicate that a device has been added to the network 304, whereas a display of an icon in a second color might indicate that a device has been removed. In addition to changing the appearance of the symbols for devices 316 and 318, as shown in FIG. 3, it may be desirable to change the appearance of the connections between such devices where appropriate. For example, an altered appearance of a connection can be used to indicate a change in status of the connection.

Figure 3:
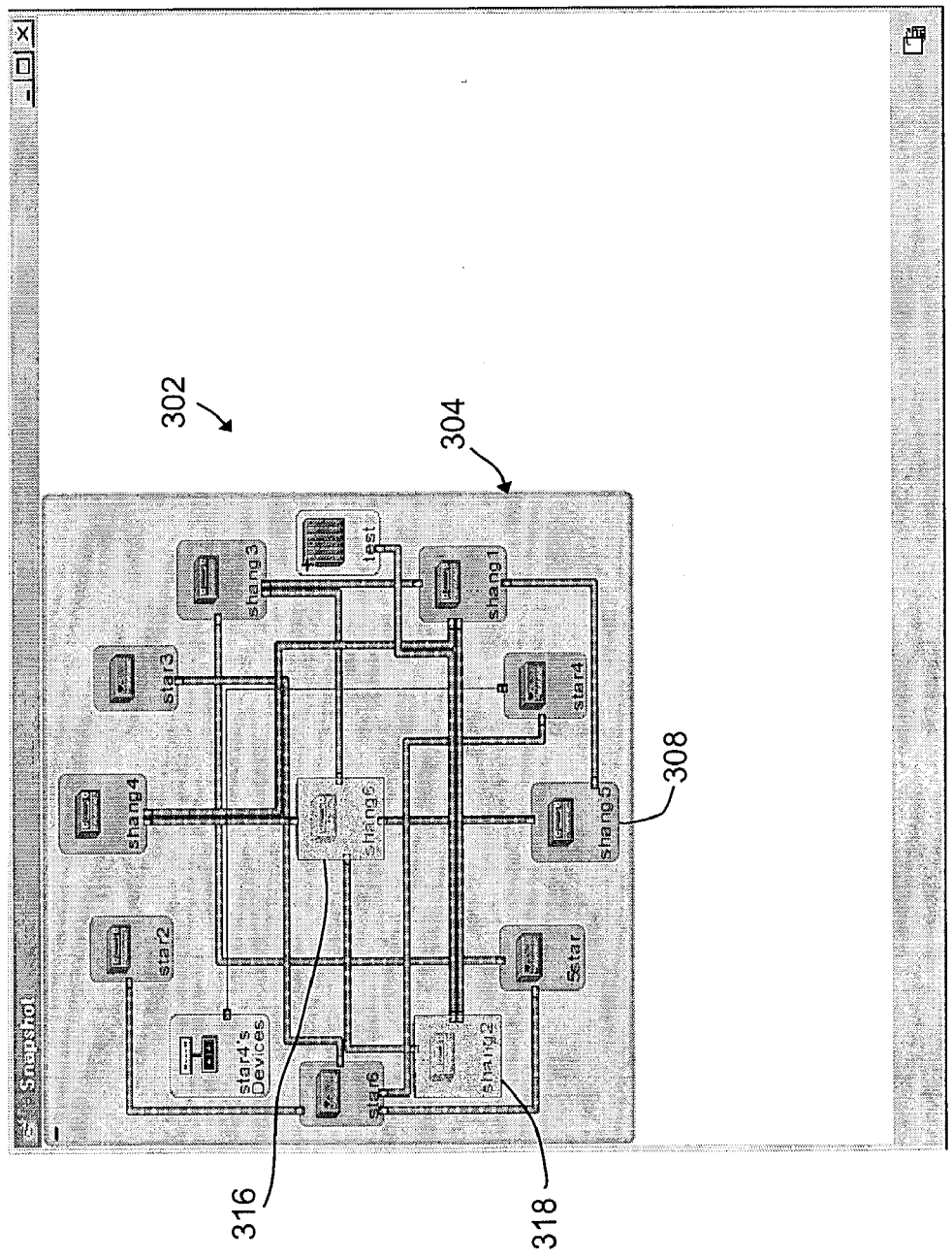
FIG. 3 is a view of a graphical user interface showing a diagram of a network.

Another method provided by the invention may also be described with respect to FIGS. 2 and 3. In a first step, the presence of a first device 208 (also referred to as a primary device) and the connection of a first set of devices (e.g., including device 212, also referred to as a set of secondary devices) to the first device 208 is determined at a first time (depicted, for example, by FIG. 2). Then, the presence of the first device (now referred to as 308 to indicate a change in time) and the connection of a second set of devices (e.g., including device 316) to the first device 308 is determined at a second time. The first set of devices are compared to the second set of devices. Next, a second device (e.g., as represented by device 212 in FIG. 2, and by device 316 in FIG. 3) is identified that is coupled to the first device at the first time, but not coupled to the first device at the second time. A display 302 is provided onto a graphical user interface 300 that includes a first symbol 308 representing the first device and a second symbol 316 representing the second device, and the second symbol 316 includes a graphical indication (in this example symbol 316 is displayed translucently) that the second device is not coupled to the first device at the second time.

Figure 4:
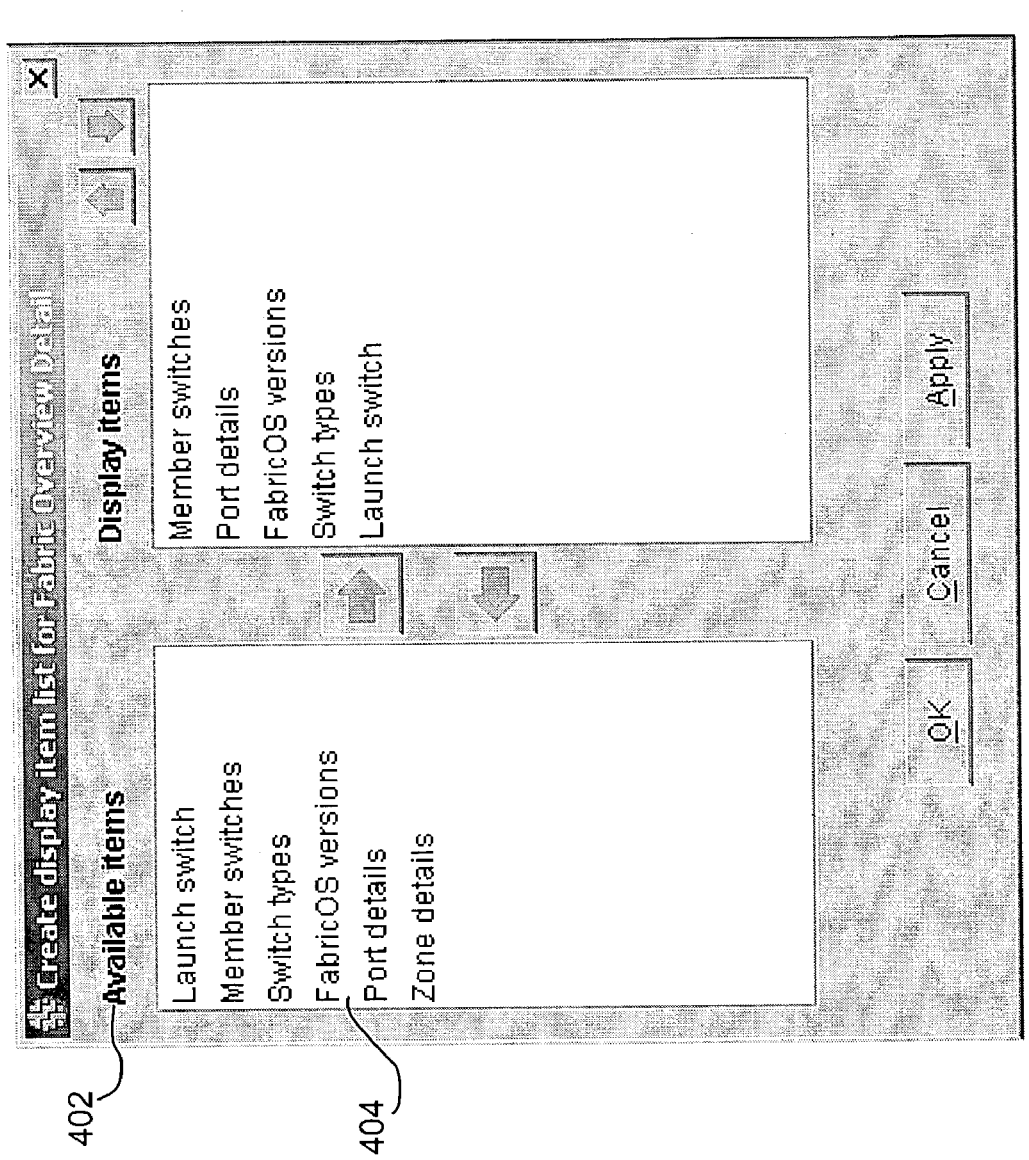
FIG. 4 is a view of a graphical user interface showing a user selectable list of network parameters.

The graphical user interfaces of the present invention generally provide a user with the ability to selectively display certain information. For example, a user can select the type of information, the order of the items and the level of detail that is desired. Referring to FIG. 4, a view is shown of a graphical user interface 400 showing a user selectable list 402 of network parameters 404. In this example, the network parameters include Launch Switch, Member Switches, Switch Types, Fabric Operating System Version, Port Details, and Zone Details. Other network aspects could also be provided on such a list. In this context, the terms parameters and aspects can be used interchangeably, and may refer as examples, to any devices or software associated with a computer network, as well as any status variables or configurable settings of such devices of software.

Figure 5:
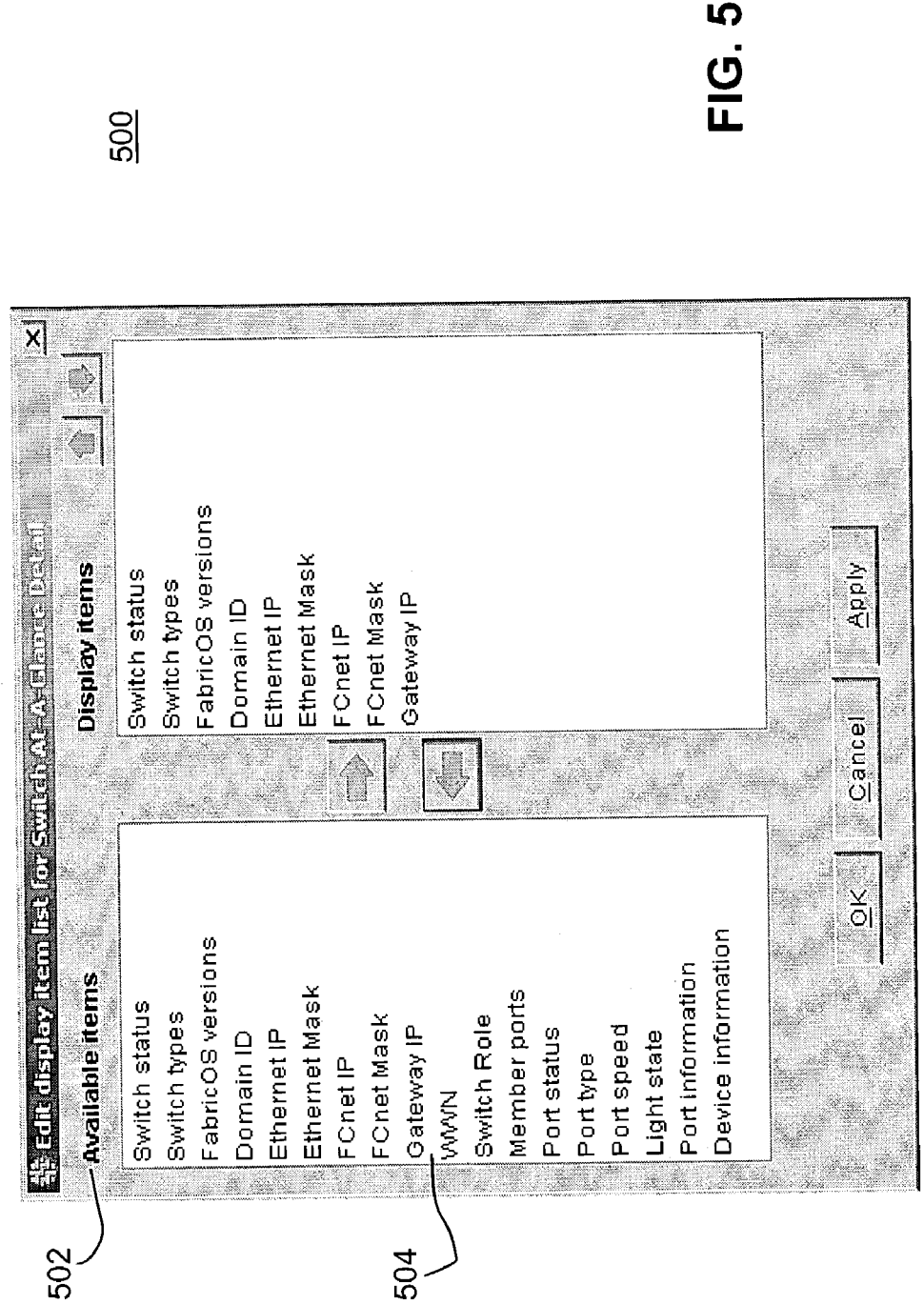
FIG. 5 is a view of a graphical user interface showing a user selectable list of network parameters.

Similarly, referring to FIG. 5, a view is shown of a graphical user interface 500 showing a user selectable list 502 of network parameters 504. As examples, the parameters 504 shown in list 502 include Switch Status, Switch Types, Fabric Operating System Versions, Domain ID, Ethernet Mask, FCnet IP, FCnet Mask, Gateway IP, WWN, Switch Role, Member Ports, Port Status, Port Type, Port Speed, Light State, Port Information, and Device Information. Other network aspects could also be provided on such a list.

As is common in Microsoft Windows™ operating system environments, user selectable lists such as 402 and 502 are generally accessed by a user of the graphical user interface in the form of options on pull-down menus. As an example, the lists 402 and 502 could be associated with different view options of the overall graphical user interface. It will be appreciated that other methods of configuring display options can also be used.

Figure 6:
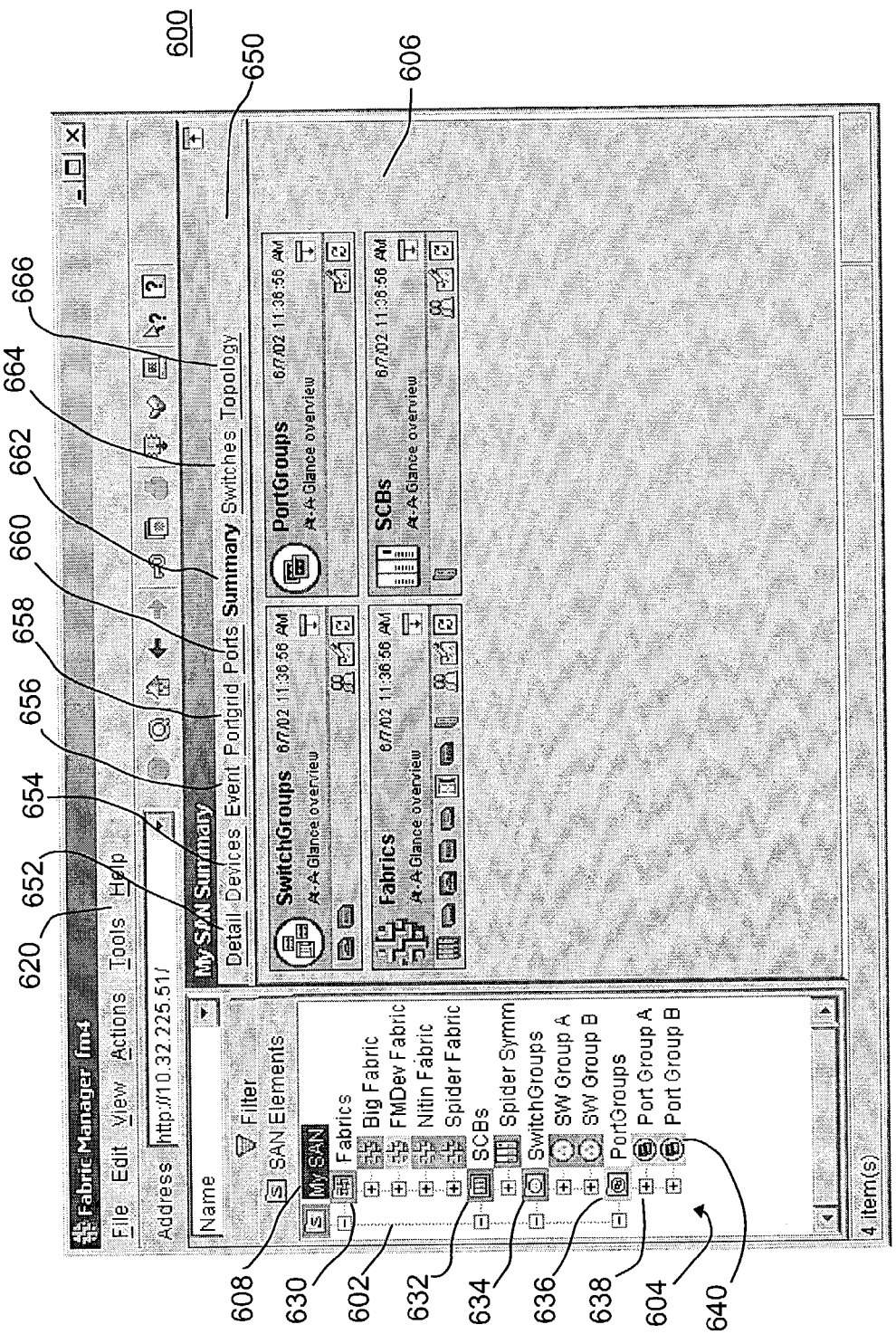
FIG. 6 is a view of a graphical user interface showing an expandable tree diagram of expandable symbols representing network devices and a summary of a user selected symbol.

Referring to FIG. 6, a view is shown of a graphical user interface 600 showing an expandable tree diagram 602 of expandable symbols 604 representing network devices and a summary 606 of a user selected symbol 608. The interface 600 is a preferred embodiment to the extent is shows multiple interface windows (e.g., 602, 606), and a main menu 620 of interface configuration options. Expandable tree diagram 602 can be configured to shown various layers of detail. By selecting one of the symbols 604, a user can expand the symbol to display the group of items represented by the symbol. Similarly, a symbol can also be selected to compress it so that less detail is provided.

As an example, symbol 608, which represents a SAN, has been user selected and expanded. The next layer of items represented by symbol 608 include Fabric Symbol 630, SCBs Symbol 632, Switch Groups Symbol 634, and Port Groups Symbol 636. These symbols are also shown in expanded form. For example, the Port Groups Symbol 636 branches into symbol 638 for Port Group A and symbol 640 for Port Group B. In various embodiments, additional layers of information may also be provided on the tree diagram 602.

In the example shown in FIG. 6, the tree diagram 602 forms only a portion of the graphical display 600. A summary display 606 is also included that provides information regarding the user selected symbol 608, which is in this example the symbol for the entire SAN. The summary 606 includes a summary menu 650 of user configurable options. In this example, such options refer to various information queries that are reported to describe selected symbol 608. In the example shown in FIG. 6, the Summary Option 662 has been selected, such that the Summary Window 606 displays general information regarding the items represented by selected symbol 608 (e.g., the next layer of detail describing Fabric Symbol 630, SCBs Symbol 632, Switch Groups Symbol 634, and Port Groups Symbol 636).

Figure 8:
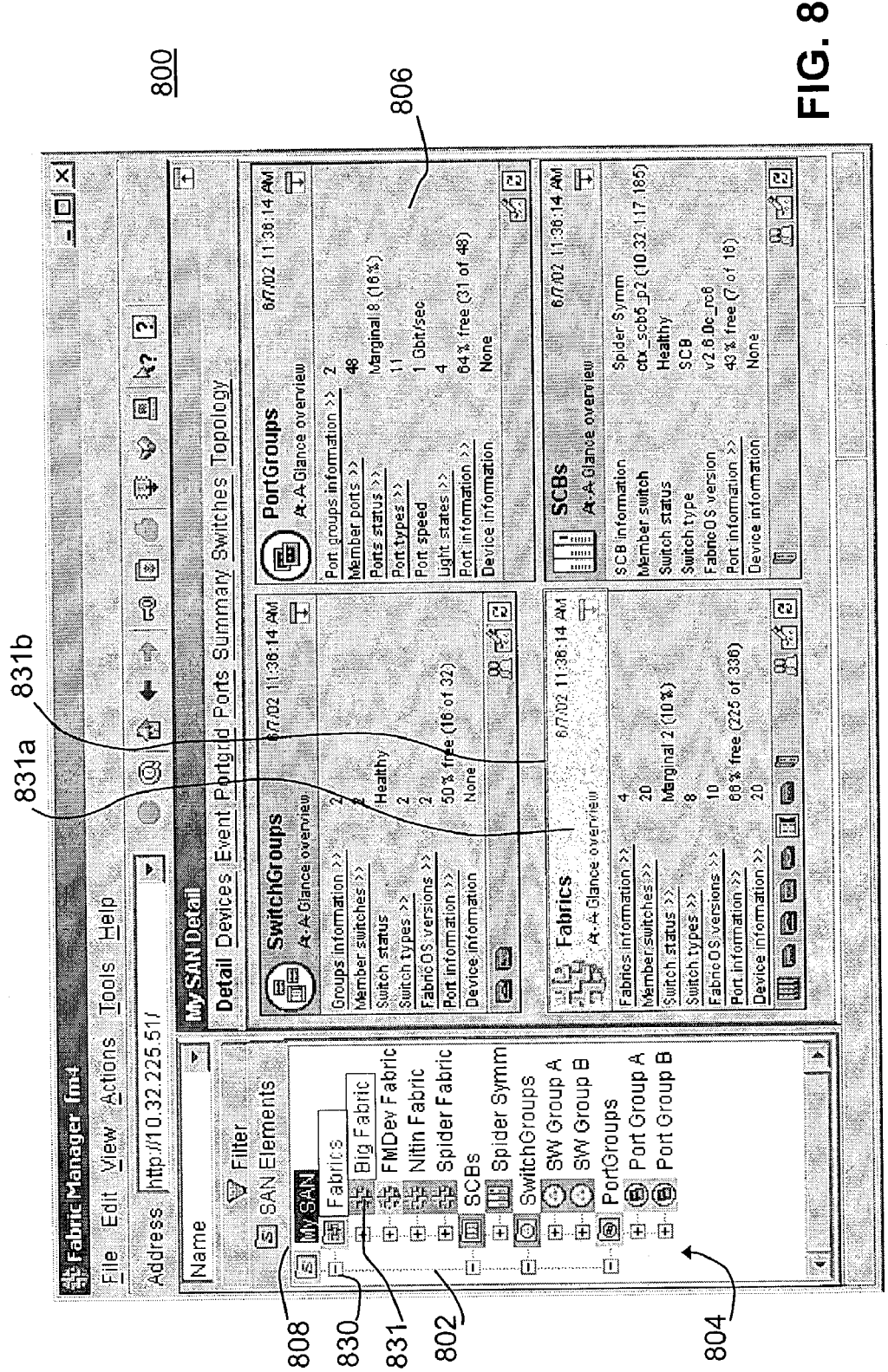
FIG. 8 is a view of a graphical user interface showing an expandable tree diagram of expandable symbols representing network devices and a summary of a user selected symbol.

A Detail Option 652 could be similarly selected to provide additional detail in the Summary Window 606 (See, e.g., FIG. 8). A Devices Option 654 can be used to filter information associated with user selected symbol 608, such that only particular information relating to devices is displayed. I will be appreciated that the various options displays of the Summary display 606 can be configured by a user to display specific information desired (e.g., through the main menu 620, as illustrated by reference to FIGS. 2 and 3). An Event Option 656 can be selected to display a log of events detected with respect to the portion of the network associated with selected symbol 608 (See, e.g., FIG. 17). Similarly, Portgrid 658, Ports 660, and Switches 662 Options 656 and 658 may be selected to convey desired information with respect to the Ports and Switches associated with the network.

Topology Option 666 can be selected to display information describing the connectivity of the portion of the network associated with selected symbol 608. For example, the diagrams 202 and 302 of FIGS. 2 and 3 show views available through topology Option 666. Other topology views may also be provided. In addition to providing topology diagrams such as diagrams 202 and 302, such information may also be presented in table form, e.g., as with the Detail Option view which generally defines a parameter for a device on a given row, and then uses columns to the right of the parameter to report name value pairs corresponding to additional information relating to the parameter. For example, the parameter could itself be a device, such as a switch, and the name value pairs reported in the table could be configuration options (e.g., logical instructions, operating system version, etc.), or status indications of the switch (e.g., whether a connection is established and whether communication on the connection is functional, performance parameters, etc.). It will be appreciated that a name value pair refers to an array of information having at least two dimensions, wherein one dimension contains the identity of a variable, and another dimension contains the values for the respective variables in the array.

In some embodiments utilizing a Summary Window 606, the Summary Window 606 relates information corresponding to selected symbol 608. Other configurations are possible. For example, information can be user selected to be conveyed in Summary Window 608 independently of what symbol is selected in the tree diagram 602. Likewise, in some cases, only some of the display options of Summary Window relate to the selected symbol 608 (e.g., the Detail Option), while other display options such as the Event Option may display events logged with regard to the network as a whole, without respect to the symbol selected in tree diagram 608.

In still other embodiments, the entire display 600 may be comprised of the Summary Window 606, of a topology view (e.g., 202, 302), of the tree diagram 602 by themselves, or of other views.

Figure 7:
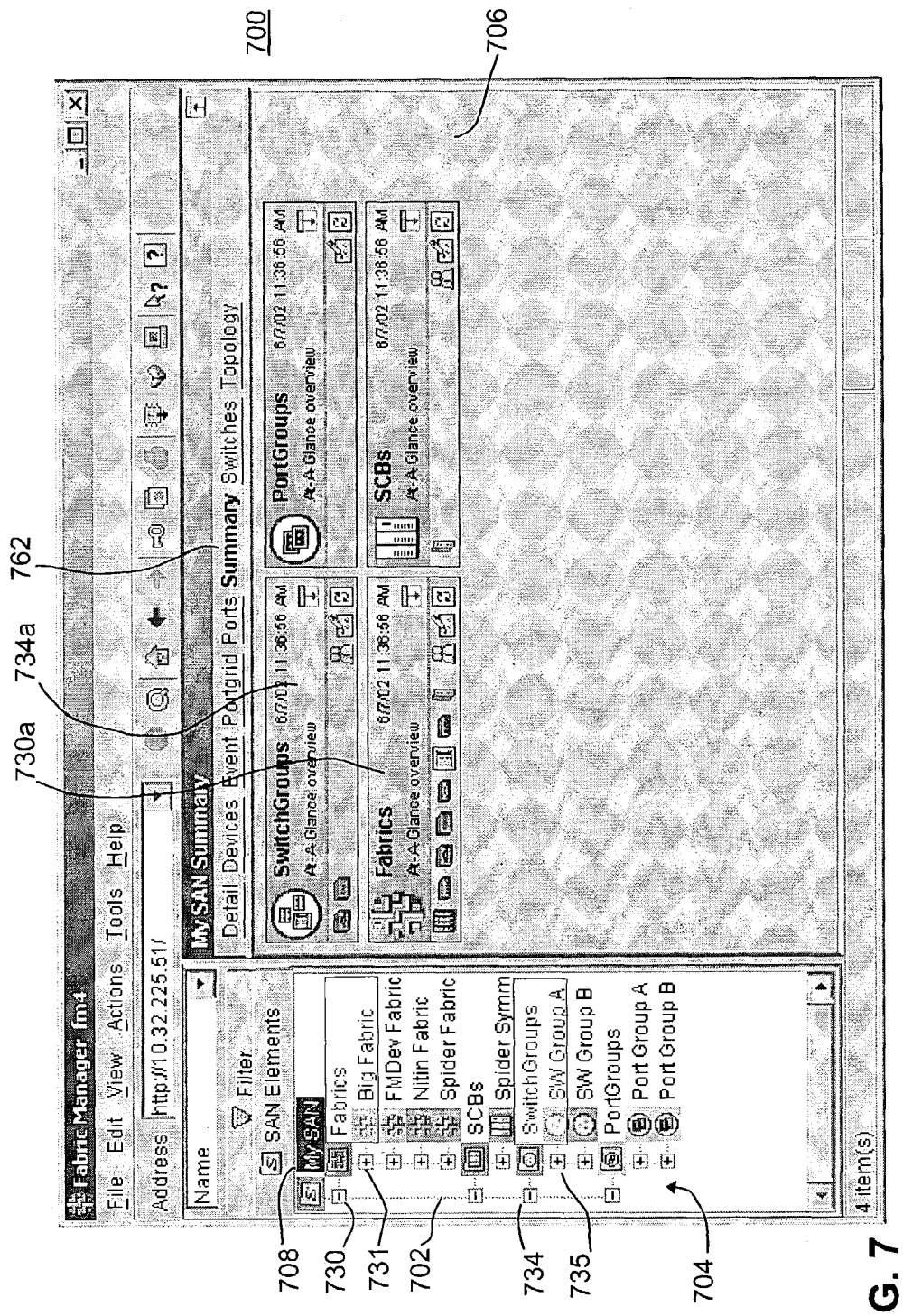
FIG. 7 is a view of a graphical user interface showing an expandable tree diagram of expandable symbols representing network devices and a summary of a user selected symbol.

Referring to FIG. 7, a view is shown of a graphical user interface 700 showing an expandable tree diagram 702 of expandable symbols 704 representing network devices and a summary 706 of a user selected symbol 708. The SAN symbol 708 is highlighted to indicate its selection, together with the Summary Option 762. In this example, the interface 700 represents a comparison of the network from a first time to a second time. A portion 731 of the Fabrics branch 730 has been altered in some way between the first and second times (e.g., the fabric is no longer detected). The symbol 731 for the portion of the Fabrics branch 730 is shown in altered form to indicate the change. In this example, the symbol 731 is shown translucently with respect to the symbols that do not reflect a change. The parent symbol 730 for changed parameter 731 can also be displayed translucently to indicate a change within that branch of the tree diagram 702 or it can be displayed in a highlight color to alert the user.

Similarly, a portion 735 of the Switch Groups branch 734 has been altered in some way between the first and second times (e.g., one of the switches has been reconfigured). The symbol 735 for the portion of the Fabrics branch 734 is shown in altered form to indicate the change. In this example, the symbol 735 is shown translucently with respect to the symbols that do not reflect a change. The parent symbol 734 for changed parameter 735 can also be displayed translucently to indicate a change within that branch of the tree diagram 702 or it can be displayed in a highlight color.

In some embodiments, a change of the parent symbols 730 and 734 would not be indicated unless the parent symbols were not expanded to display the higher level of detail including the symbols 731 and 732 reflecting the actual changes detected. Other display configurations are possible. For example, the appearance of the symbols 730a and 734a in the Summary display 706 could also be altered to reflect the changes. As another example, as previously indicated, multiple types of symbol alterations could be used to indicate various different types of changes. For example, where a switch configuration change has not resulted in a loss of operation of the changed switch indicated by tree symbol 735, the symbol 735 could be displayed both translucently and in another color (e.g., green). Similarly, in such a case, the symbol 735 could be displayed translucently to indicate the presence of a change, and the symbol 734a could be displayed in a particular color indicating operability status (e.g., whether there is a problem that needs to be addressed). In this way, the interface 700 can be used to convey not only changes in the network structure and configuration, but also whether events have occurred requiring action.

Referring to FIG. 8, a view is shown of a graphical user interface 800 showing an expandable tree diagram 802 of expandable symbols 804 representing network devices and details 806 of a user selected symbol 808. A portion 831 of the Fabrics branch 830 has been altered in some way between the first and second times. The symbol 831 for the portion of the Fabrics branch 830 is shown in altered form to indicate the change. In this example, the symbol 831 is shown translucently with respect to the symbols that do not reflect a change. The parent symbol 830 for changed parameter 831 can be displayed translucently or as a highlight to indicate a change within that branch of the tree diagram 802. The symbol 831a corresponding to changed parameter 831 is also displayed translucently to indicate that a change has occurred. In this example, the Detail Option 852 of the Details display 806 is selected such that various details (e.g., as discussed with respect to FIG. 4) are provided with respect to the selected symbol 808 in the tree diagram 802.

The graphical user interface 800 can be configured to automatically update comparisons of a snapshots of the network. For example, it may be desirable for the display 800 to update itself every five minutes. In the example shown in FIG. 8, the symbol 831a of the Summary Window 806 shows a time and date stamp 831b. The other symbols in Summary Window 806 generally also include such data stamps. The time and date stamp 831b can be used, as an example, to indicate the last time a comparison of the network between different times was updated with respect to symbol 831a. For example, if for some reason, the interface 800 has not been able to update a comparison corresponding to symbol 831a (also represented by symbol 830), the time and date stamp 831b will continue to display the time and date from the last update. In this way, the interface 800 can be used to indicate what portions of the network have been surveyed.

Another aspect of the present invention is that in some embodiments, the communication of the graphical user interface with the devices on the network represented by the interface can be achieved through a special network independent of the main network. For example, a Fibre Channel SAN may be generally made up of Fibre Channel devices that communicate via Fibre Channel connections. However, the communication of information from such devices to each other and to a graphical user interface may be conducted via a more conventional network such as an Ethernet network, the Internet, an Intranet network, etc. This allows the performance of the SAN to be less affected by the demands of the user interface.

Likewise, the communication of the user interface with the devices on the network can also be accomplished through various protocols independent from whatever protocols may be in use among the SAN devices. For example, it may be desirable to operate Fibre Channel SAN networks using proprietary protocols implemented by the Fabric OS™ from Brocade Communication Systems, Inc., to facilitate superior performance. While such protocols may also provide the ability to accommodate more standard communication protocols such as SNMP and IP, it may nevertheless be desirable to conduct communication of the user interface with a network via a more convention network using a more conventional communication protocol, e.g., to preserve the bandwidth available on the SAN.

Figure 9:
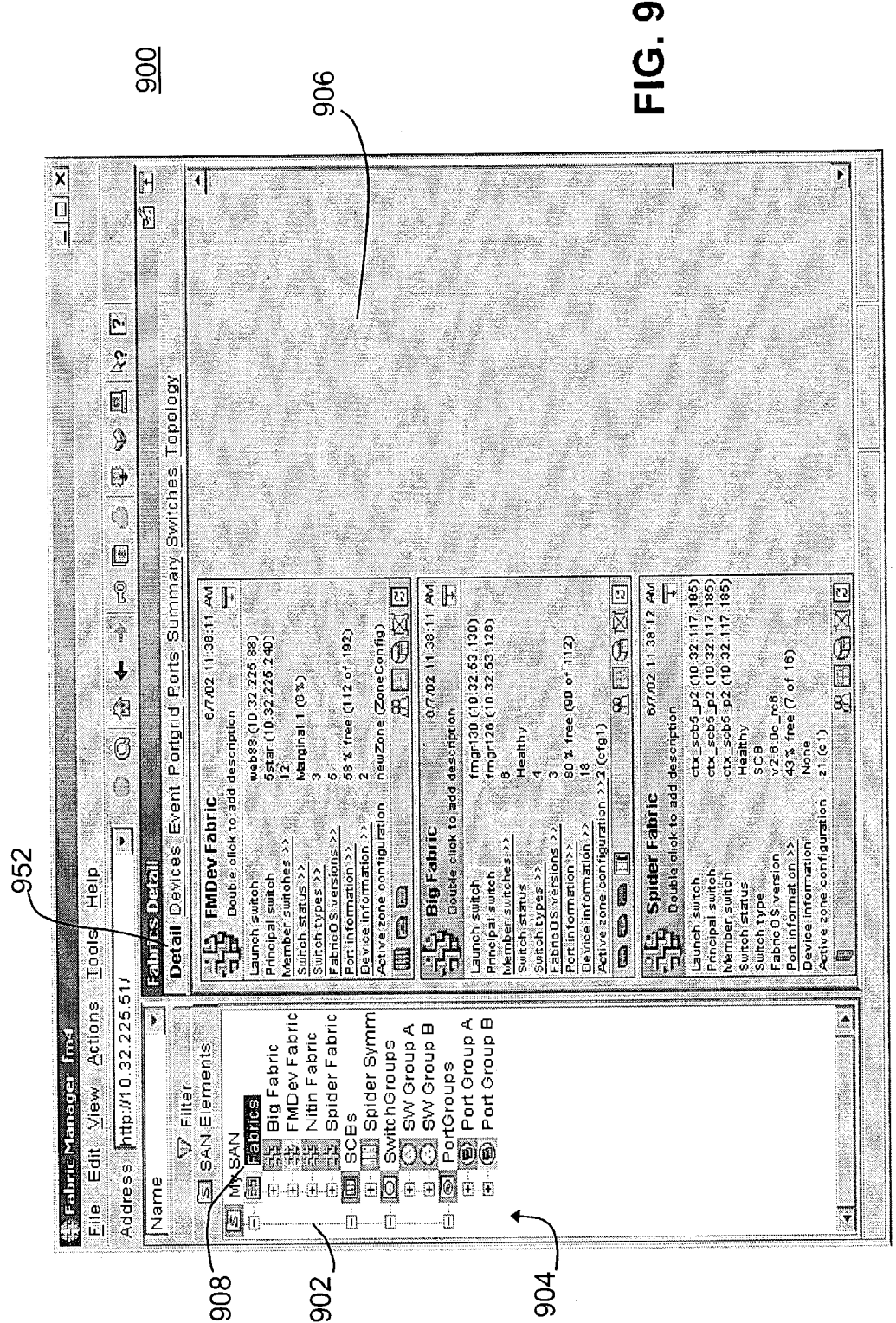
FIG. 9 is a view of a graphical user interface showing an expandable tree diagram of expandable symbols representing network devices and details of a user selected symbol.

Referring to FIG. 9, a view is shown of a graphical user interface 900 showing an expandable tree diagram 902 of expandable symbols 904 representing network devices and a details 906 of a user selected symbol 908. The user selected symbol 908 in this example is an expandable symbol representing a group of fabrics associated with a SAN. The Detail Display Option 952 is selected in the Details Window 906, such that the Details Window displays a list of the fabrics in the group of fabrics represented by selected symbol 908, and a list of user selected details associated with each fabric.

Figure 10:
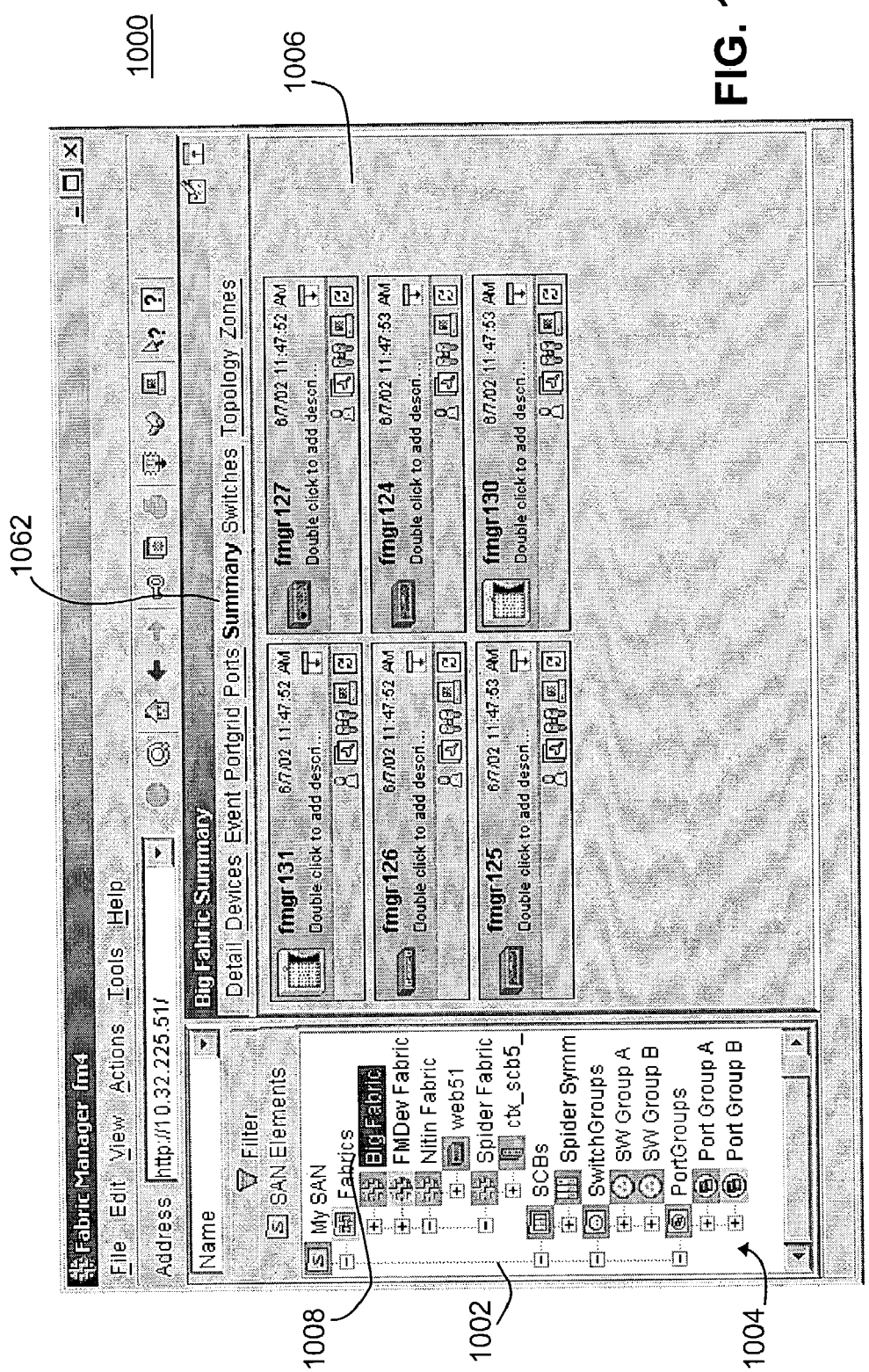
FIG. 10 is a view of a graphical user interface showing an expandable tree diagram of expandable symbols representing network devices and details of a user selected symbol.

Referring to FIG. 10, a view is shown of a graphical user interface 1000 showing an expandable tree diagram 1002 of expandable symbols 1004 representing network devices and a summary 1006 of a user selected symbol 1008. The user selected symbol 1008 in this example is an expandable symbol representing a particular fabric in a group of fabrics of a SAN. The Summary Display Option 1062 is selected in the Summary Window 1006, such that the Summary Window 1006 displays a list of devices associated with the particular fabric represented by symbol 1008, and a summary for each device.

Figure 11:
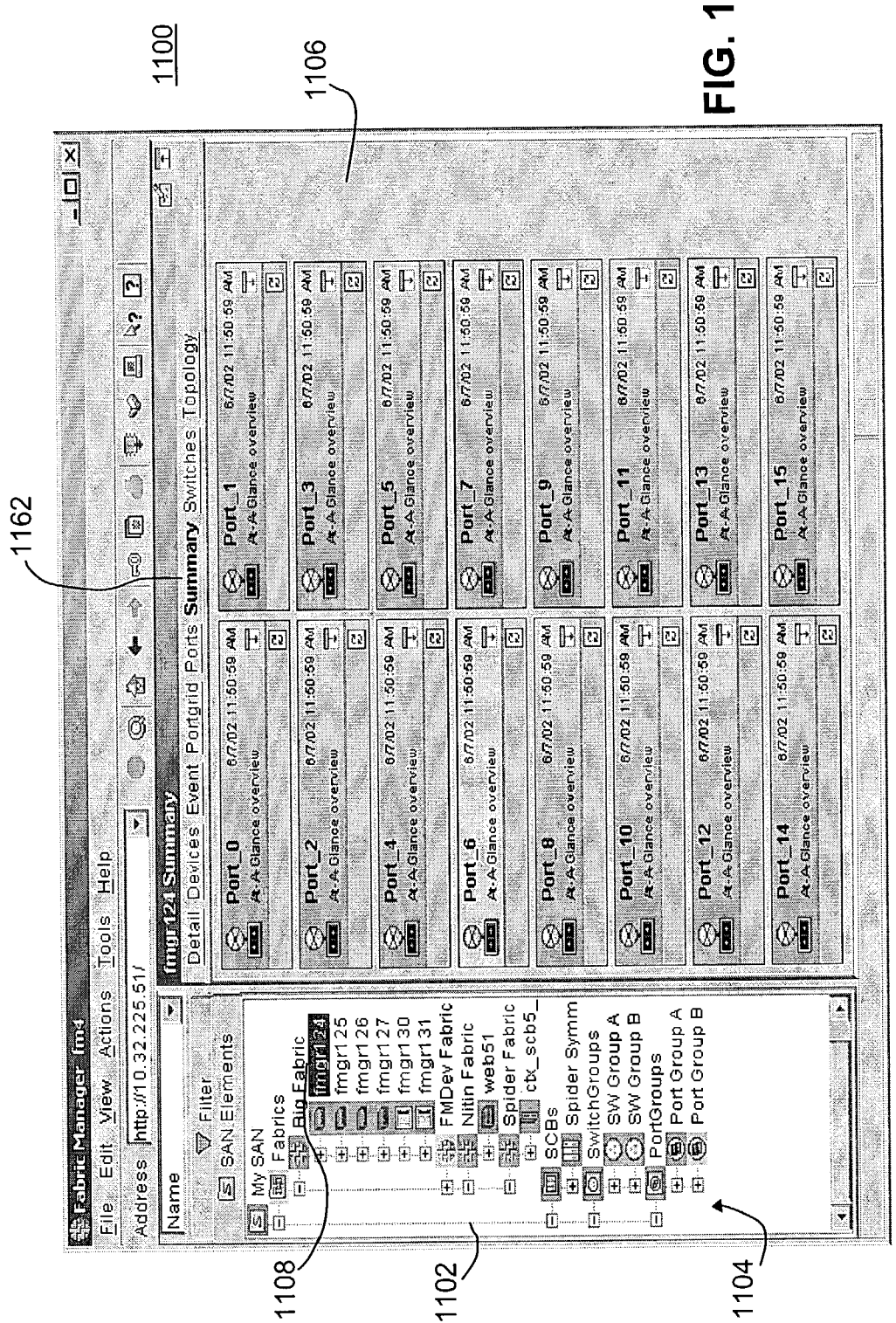
FIG. 11 is a view of a graphical user interface showing an expandable tree diagram of expandable symbols representing network devices and a summary of a user selected symbol.

Referring to FIG. 11, a view is shown of a graphical user interface 1100 showing an expandable tree diagram 1102 of expandable symbols 1104 representing network devices and a summary 1106 of a user selected symbol 1108. The user selected symbol 1108 in this example represents a switch within a fabric associated with a SAN. The Summary Display Option 1162 is selected in the Summary Window 1106, such that the Summary Window 1106 displays parameters associated with the switch represented by symbol 1108, and a summary for each. In this example, the switch parameters displayed are ports associated with the switch represented by symbol 1108.

Figure 12:
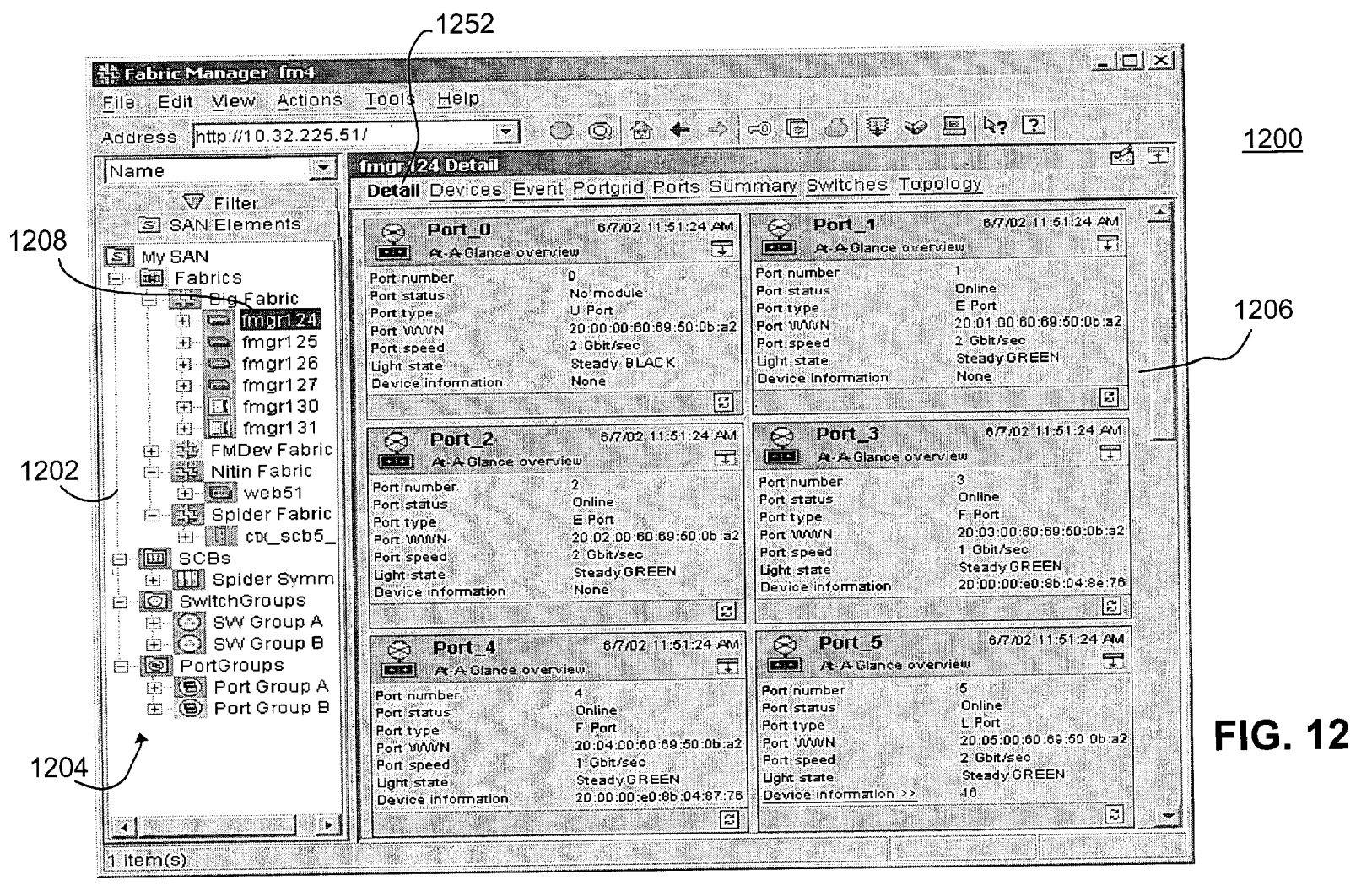

Referring to FIG. 12, a view is shown of a graphical user interface 1200 showing an expandable tree diagram 1202 of expandable symbols 1204 representing network devices and details 1206 of a user selected symbol 1208. Like FIG. 11, the user selected symbol 1208 represents a switch within a fabric associated with a SAN. In this example, the Detail Display Option 1252 is selected in the Details Window 1206, such that the Details Window 1206 displays a list of parameters associated with the switch represented by symbol 1208 (here the parameters are ports), and details information describing each.

Figure 13:
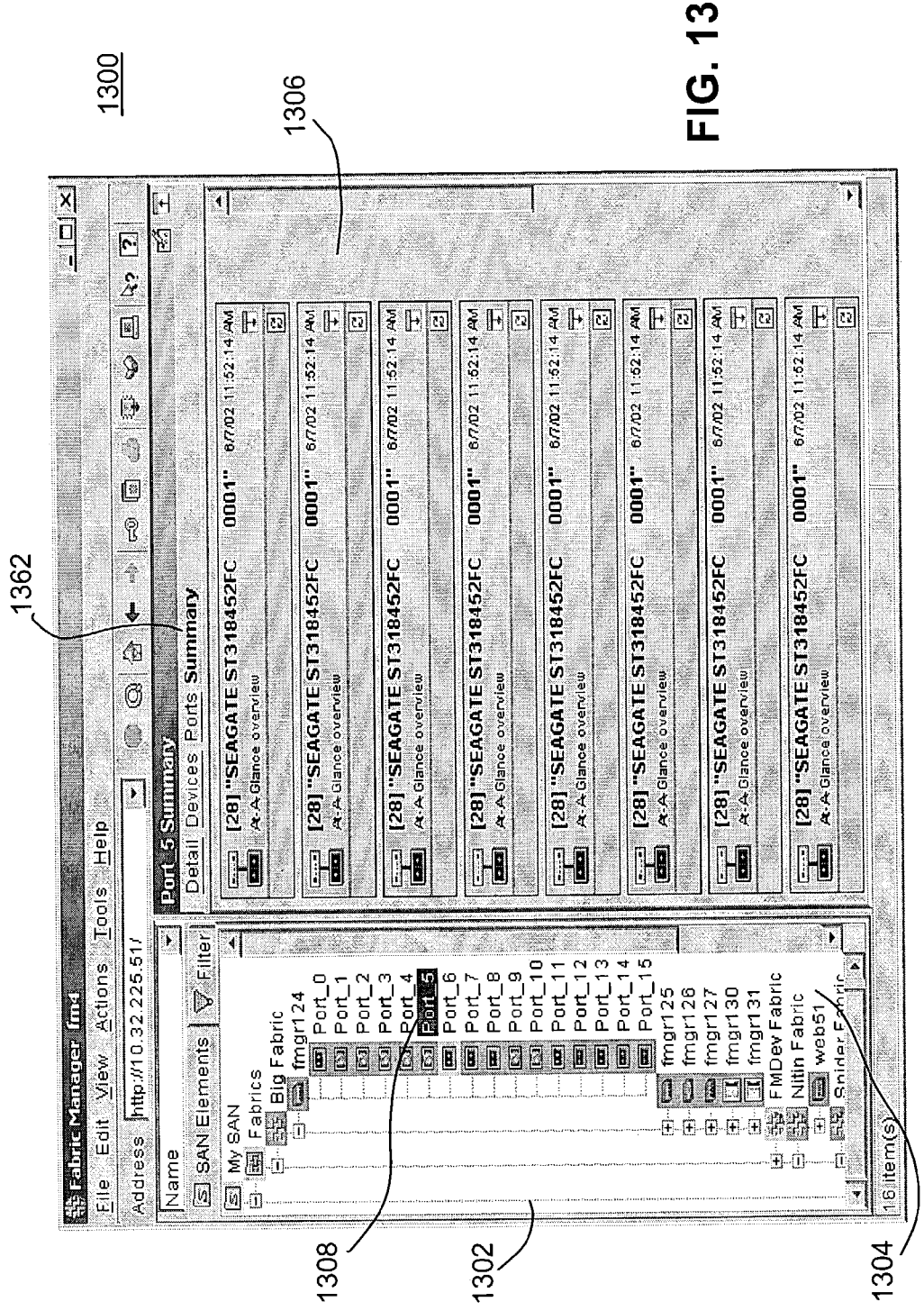
FIG. 13 is a view of a graphical user interface showing an expandable tree diagram of expandable symbols representing network devices and a summary of a user selected symbol.

Referring to FIG. 13, a view is shown of a graphical user interface 1300 showing an expandable tree diagram 1302 of expandable symbols 1304 representing network devices and a summary 1306 of a user selected symbol 1308. In this example, the user selected symbol 1308 represents a port of a switch within a fabric associated with a SAN. The Summary Display Option 1362 is selected in the Summary Window 1306, such that the Summary Window 1306 displays a list of parameters associated with the port represented by symbol 1308 (here the parameters are storage devices), and a summary for each.

Figure 14:
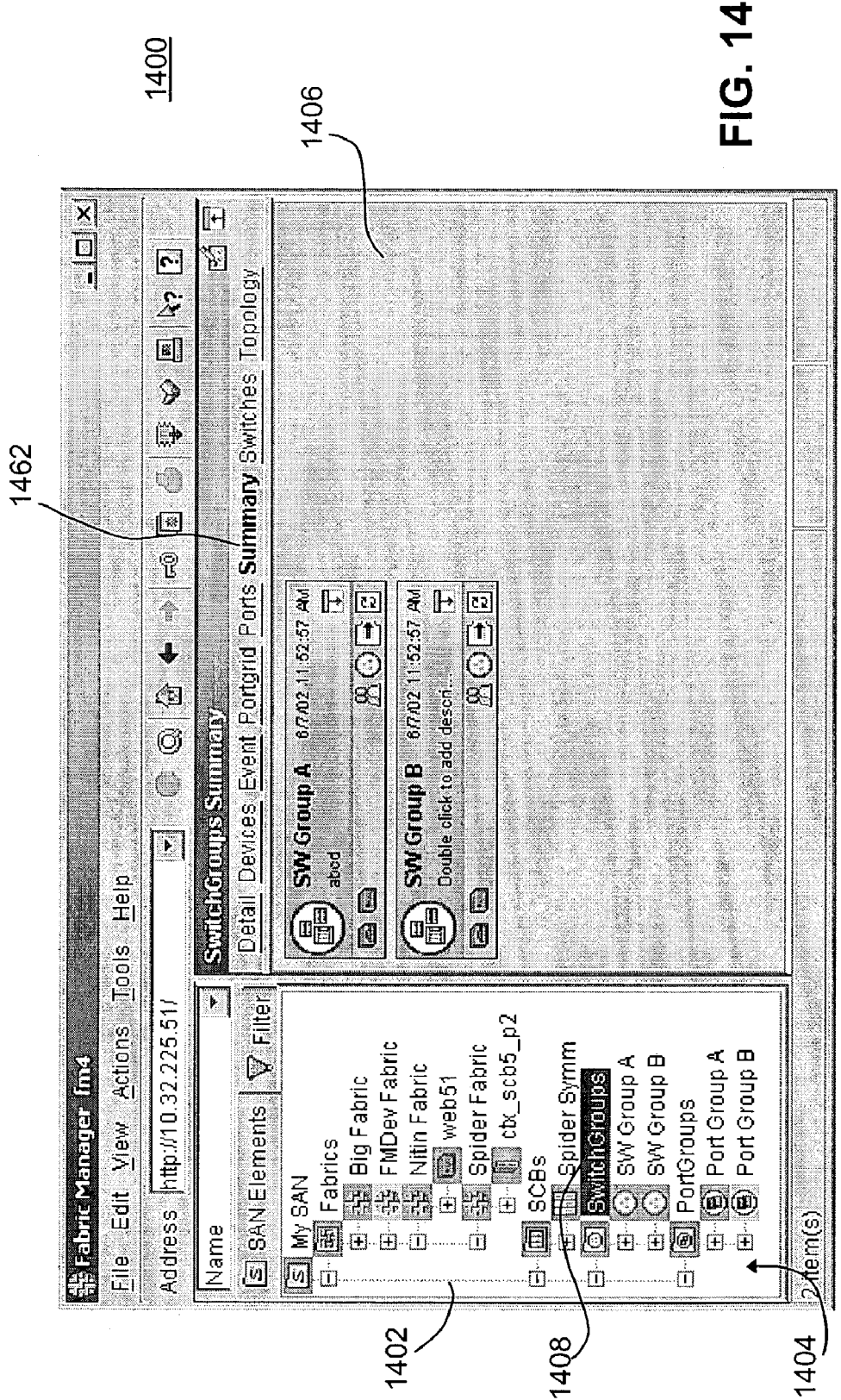
FIG. 14 is a view of a graphical user interface showing an expandable tree diagram of expandable symbols representing network devices and a summary of a user selected symbol.

Referring to FIG. 14, a view is shown of a graphical user interface 1400 showing an expandable tree diagram 1402 of expandable symbols 1404 representing network devices and a summary 1406 of a user selected symbol 1408. The user selected symbol 1408 in this example represents a group of logical switch groups associated with a SAN. The Summary Display Option 1462 is selected in the Summary Window 1406, such that the Summary Window 1406 displays a list of switch groups represented by symbol 1408, and a summary for each. In this example, the switch parameter's displayed are ports associated with the switch represented by symbol 1408.

Figure 15:
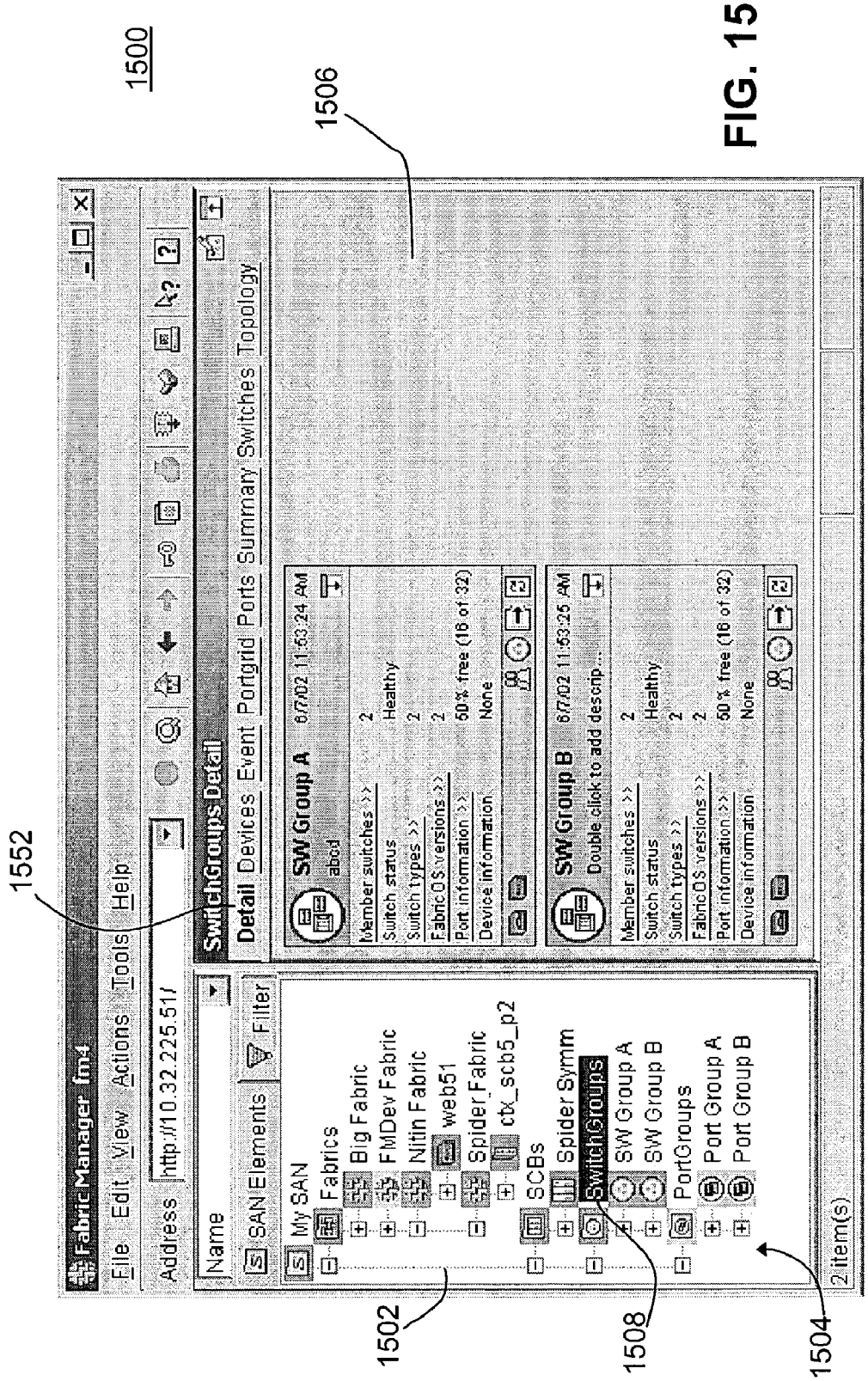
FIG. 15 is a view of a graphical user interface showing an expandable tree diagram of expandable symbols representing network devices and details of a user selected symbol.

Referring to FIG. 15, a view is shown of a graphical user interface 1500 showing an expandable tree diagram 1502 of expandable symbols 1504 representing network devices and details 1506 of a user selected symbol 1508. Like FIG. 14, the user selected symbol 1508 in this example represents a group of logical switch groups associated with a SAN. In the example shown in FIG. 15, the Detail Display Option 1552 is selected in the Details Window 1506, such that the Details Window 1506 displays a list of switch groups represented by symbol 1508, and a detailed description of each.

Figure 16:
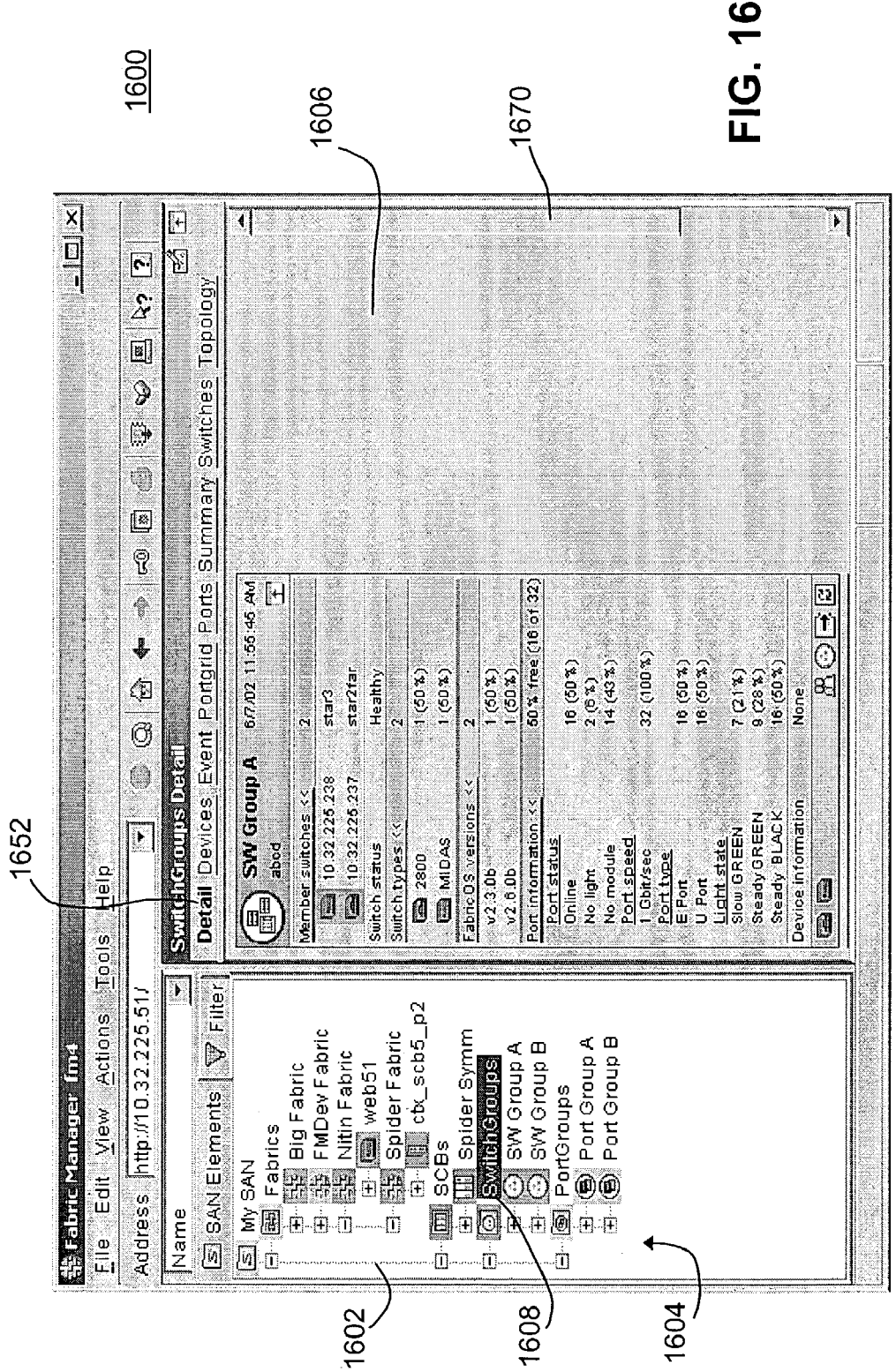
FIG. 16 is a view of a graphical user interface showing an expandable tree diagram of expandable symbols representing network devices and details of a user selected symbol.

Referring to FIG. 16, a view is shown of a graphical user interface 1600 showing an expandable tree diagram 1602 of expandable symbols 1604 representing network devices and details 1606 of a user selected symbol 1608. Like FIGS. 14 and 15, the user selected symbol 1608 in this example represents a group of logical switch groups associated with a SAN. Like FIG. 15, the Detail Display Option 1662 is selected in the Details Window 1606, such that the Details Window 1606 displays a list of switch groups represented by symbol 1508, and a detailed description of each. As previously discussed, the particular parameters shown in a view of the Details Window (the Detail Option in this case) are user-selectable. The Details Window 1606 is shown including a more extensive array of parameters reported than the Details Window 1506 of FIG. 15. In the Details Window 1606 of FIG. 16, a scroll bar 1670 is provided to allow a user to view specified data in the Details Window 1606 where there is not enough space in the Details Window 1606 to display the data all at once.

Figure 17:
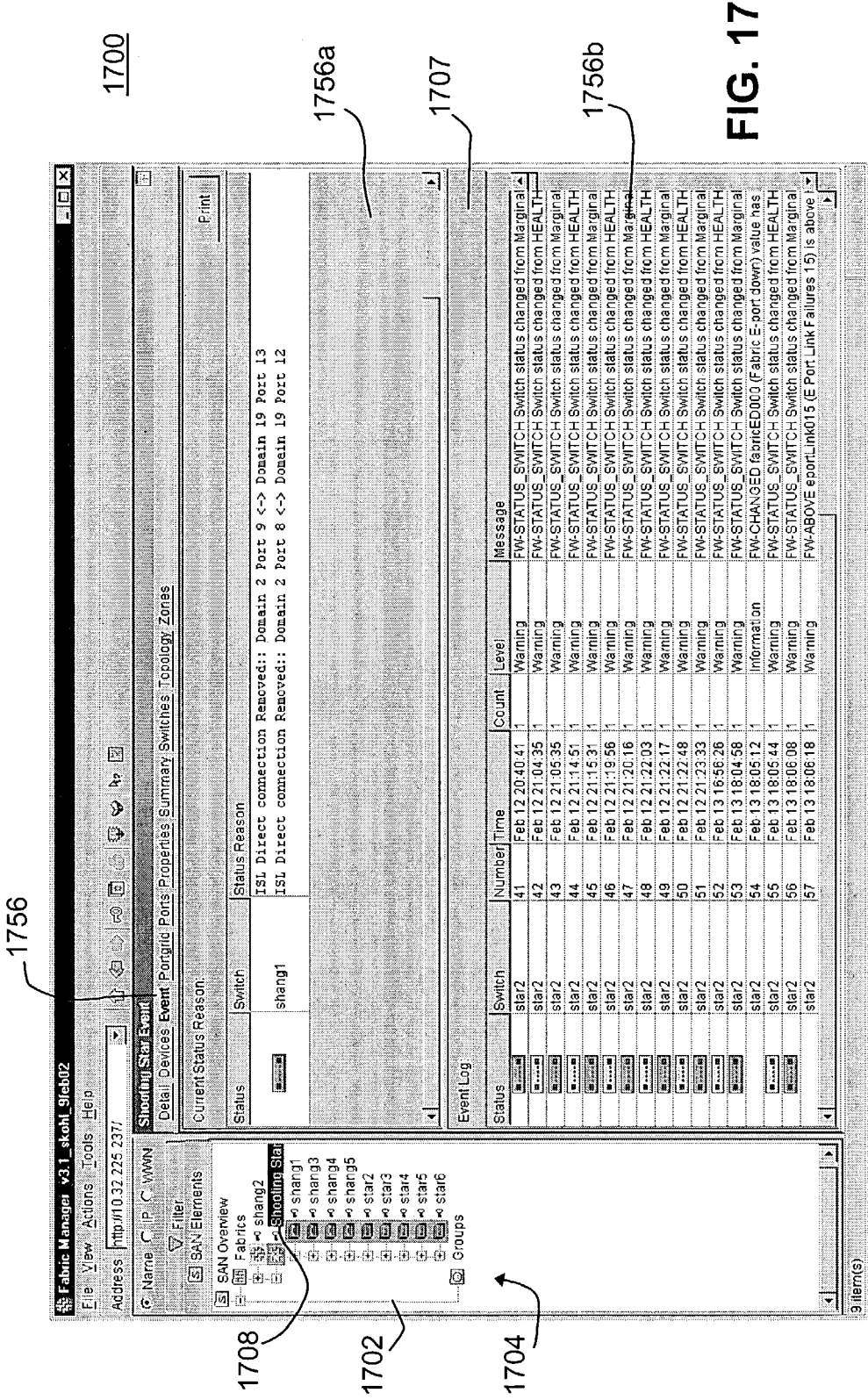
FIG. 17 is a view of a graphical user interface showing an expandable tree diagram of expandable symbols representing network devices and an event log corresponding to a user selected symbol.

Referring to FIG. 17, a view is shown of a graphical user interface 1700 showing an expandable tree diagram 1702 of expandable symbols 1704 representing network devices and an event log 1707 corresponding to a user selected symbol 1708. In this example, the user selected symbol 1708 represents a particular fabric within a group of fabrics associated with a SAN. The Event Display Option 1756 is selected in the Summary Window 1707, such that the Summary Window 1707 displays a list of events associated with the fabric represented by symbol 1708. In this example, the Event view of the Summary Window 1707 is divided into two portions. A first portion 756*a* displays the current status, and a reason for that status, for every device in the group of devices represented by selected symbol 1708. A second portion 1756*b* of Summary Window 1707 displays an event log for all events detected within the group of devices represented by selected symbol 1708.

It will be appreciated that, while various aspects of graphical user interfaces have been described individually, combinations of such aspects can also be combined into a single graphical user interface. For example, a window containing the topology view discussed with respect to FIGS. 2 and 3 can be included as a portion of any of the user interfaces described herein. Likewise, the event log described with respect to FIG. 17 can also be included as a portion of any of the user interfaces described herein. In general, in some embodiments, each of the various display options of the Summary Window can be shown as separate windows within a common graphical user interface. In such cases where a graphical user interface is configured to convey a large amount of data, it may be desirable to employ a relatively large display.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method of displaying changes in device connections over time in a network, comprising:
    displaying on a graphical user interface a primary device and a set of secondary devices coupled to the primary device from a first time reference;
    displaying on the graphical user interface the set of secondary devices coupled to the primary device from a second time reference; and
    indicating a change in the set of secondary devices from the first time reference to the second time reference by altering an appearance of a symbol for a changed device in the set of secondary devices on the graphical user interface.

2. The method of claim 1, wherein the step of altering the appearance of the symbol includes changing a translucency of the symbol.

3. The method of claim 1, further including:
    rendering a table representing a set of name value pairs; and
    altering a representation of a name value pair in the set to indicate a change in the name value pair from the first time to the second time.

4. The method of claim 1, further including:
    storing the change in an event log; and
    rendering the event log as a portion of the graphical user interface.

5. The method of claim 1, further including:
    rendering an expandable symbol representing a group of the secondary devices forming said network.

6. The method of claim 1, further including:
    rendering a diagram of said device connections.

7. The method of claim 1, further including:
    rendering an expandable symbol in a first window of the graphical user interface, the expandable symbol representing a group of the secondary devices forming said network;
    rendering a diagram of said device connections; and
    rendering a table in a third window of the graphical user interface, the table having a list of the secondary devices in a first column, the table having status values in a second column, the status values corresponding to the secondary devices.

8. The method of claim 1, further including:
rendering an expandable tree diagram of expandable symbols, each of the expandable symbols representing a group of the secondary devices.

9. The method of claim 8, further including:
selecting one of the expandable symbols according to a user input; and
rendering a summary of the group of secondary devices represented by the expandable symbol.

10. The method of claim 1, wherein said network includes a storage area network.

11. The method of claim 1, wherein said network includes a switched fabric Fibre Channel network.

12. The method of claim 1, wherein said network includes at least one Fibre Channel switch.

13. The method of claim 1, wherein said network includes at least one Fibre Channel switch, at least one data storage device, and at least one server.

14. The method of claim 1, further including:
providing a menu of user selectable network parameters, wherein each of the steps of determining at a first time and determining at a second time includes determining the status of a parameter selected from the menu of user selectable network parameters.

15. A graphical user interface for displaying changes in device connections over time in a network, comprising:
a first display mode wherein a first device and a first set of second devices coupled to the first device are displayed; and
a second display mode wherein a display of a second set of second devices is combined with the first set of second devices, such that a second device is displayed in a manner indicating the second device is present in only one of the first and second sets.

16. The graphical user interface of claim 15, wherein the second device is displayed translucently to indicate the second device is present in only one of the first and second sets.

17. The graphical user interface of claim 15, wherein the second device is displayed in an altered color to indicate the second device is present in only one of the first and second sets.

18. The graphical user interface of claim 15, further including:
a table representing a set of name value pairs, wherein a representation of a name value pair in the set is altered to indicate the second device is present in only one of the first and second sets.

19. The graphical user interface of claim 15, further including:
a circuit for storing an event in an event log when the second device is present in only one of the first and second sets, wherein the event log is rendered as a portion of said graphical user interface.

20. The graphical user interface of claim 15, further including:
an expandable symbol representing a group of devices forming said network.

21. The graphical user interface of claim 15, further including:
a diagram representing said device connections.

22. The graphical user interface of claim 15, further including:
an expandable symbol rendered in a first window of said graphical user interface, the expandable symbol representing a group of the secondary devices forming said network;
a diagram of said device connections rendered in a second window; and
a table rendered in a third window of said graphical user interface, the table having a list of said device connections in a first column, the table having status values in a second column, the status values corresponding to said device connections.

23. The graphical user interface of claim 15, further including:
an expandable tree diagram of expandable symbols, each of the expandable symbols representing a group of the secondary devices.

24. The graphical user interface of claim 23, further including:
a summary of a group of devices coupled to said network, the group of devices being represented by an expandable symbol of the expandable tree diagram.

25. The graphical user interface of claim 15, wherein said network includes a storage area network.

26. The graphical user interface of claim 15, wherein said network includes a switched fabric Fibre Channel network.

27. The graphical user interface of claim 15, wherein said network includes at least one Fibre Channel switch.

28. The graphical user interface of claim 15, wherein said network includes at least one Fibre Channel switch, at least one data storage device, and at least one server.

* * * * *